(12) United States Patent
Enzmann et al.

(10) Patent No.: US 10,095,463 B2
(45) Date of Patent: Oct. 9, 2018

(54) SYSTEM, METHOD AND APPARATUS FOR WIRELESS COMMUNICATION BETWEEN A WIRELESS MOBILE TELECOMMUNICATIONS DEVICE AND A REMOTE WIRELESS DISPLAY

(71) Applicant: AT&T Mobility II LLC, Atlanta, GA (US)

(72) Inventors: Mark J. Enzmann, Blairsville, GA (US); Paul Christopher Grooms, Suwanee, GA (US); Robert Torrence Moton, Jr., Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 40 days.

(21) Appl. No.: 14/330,773

(22) Filed: Jul. 14, 2014

(65) Prior Publication Data

US 2014/0320381 A1     Oct. 30, 2014

Related U.S. Application Data

(63) Continuation of application No. 13/690,734, filed on Nov. 30, 2012, now Pat. No. 8,781,535, which is a
(Continued)

(51) Int. Cl.
*G09G 5/00* (2006.01)
*G06F 3/147* (2006.01)
(Continued)

(52) U.S. Cl.
CPC ............ *G06F 3/147* (2013.01); *G06F 3/1454* (2013.01); *H04M 1/00* (2013.01); *H04M 1/7253* (2013.01);
(Continued)

(58) Field of Classification Search
CPC ... H04N 9/3147; G06F 3/1423; G06F 3/1454; G06F 3/147; G09G 2360/04;
(Continued)

(56) References Cited

U.S. PATENT DOCUMENTS 6,496,122 B2 * 12/2002 Sampsell .............. H03J 1/0025
340/12.28
6,757,551 B2    6/2004 Newman et al.
(Continued)

FOREIGN PATENT DOCUMENTS

WO    WO 2004/006563    1/2004
WO    WO 2005/024774    3/2005

OTHER PUBLICATIONS

U.S. Office Action dated Sep. 15, 2006 in U.S. Appl. No. 11/090,154.
(Continued)

*Primary Examiner* — Huy C Ho
(74) *Attorney, Agent, or Firm* — Hartman & Citrin LLC

(57) ABSTRACT

A method and apparatus provide for removal of a display screen from a wireless device, or, in a different embodiment, provide for a display screen as a separate and additional device that functions in real time in the same way as if the screen were incorporated in the wireless device. This functionality is enabled by a short range wireless connection, such as Bluetooth, between transceivers located in the wireless device and the display screen device. The display screen device allows a user to monitor the associated wireless device without needing to operate the full device. The display screen device may also have control capability for controlling the wireless device. Thus, a user can monitor and control a mobile device from a smaller remote display device while being presented with the information that would be displayed on the display screen of the wireless device.

20 Claims, 7 Drawing Sheets

Related U.S. Application Data continuation of application No. 13/297,179, filed on Nov. 15, 2011, now Pat. No. 8,532,645, which is a continuation of application No. 11/090,154, filed on Mar. 28, 2005, now Pat. No. 8,081,964.

(51) Int. Cl.
*G06F 3/14* (2006.01)
*H04M 1/00* (2006.01)
*H04M 1/725* (2006.01)
*H04M 1/02* (2006.01)

(52) U.S. Cl.
CPC ... *G09G 2370/022* (2013.01); *G09G 2370/16* (2013.01); *H04M 1/0254* (2013.01); *H04M 1/0266* (2013.01); *H04M 2250/02* (2013.01); *H04M 2250/16* (2013.01)

(58) Field of Classification Search
CPC ........ G09G 2360/06; G09G 2370/022; H04M 1/00; H04M 1/7253; H04M 1/0254; H04M 1/0266; H04M 2250/02; H04M 2250/16
USPC ......................................................... 345/1.1
See application file for complete search history.

(56) References Cited

U.S. PATENT DOCUMENTS

| | | | |
|---|---|---|---|
| 6,882,326 B2* | 4/2005 | Hirayama et al. | 345/1.1 |
| 7,027,835 B2 | 4/2006 | Kabatek | |
| 7,149,543 B2 | 12/2006 | Kumar | |
| 7,215,977 B2 | 5/2007 | Glover | |
| 7,218,315 B2* | 5/2007 | Takeuchi et al. | 345/204 |
| 7,269,452 B2 | 9/2007 | Cheung et al. | |
| 7,292,588 B2* | 11/2007 | Milley et al. | 370/401 |
| 2002/0045442 A1 | 4/2002 | Silen et al. | |
| 2002/0109582 A1 | 8/2002 | Mooney et al. | |
| 2003/0011488 A1 | 1/2003 | Chotkowski et al. | |
| 2003/0211865 A1 | 11/2003 | Azami et al. | |
| 2004/0082361 A1 | 4/2004 | Rajagopalan | |
| 2004/0119660 A1* | 6/2004 | Okuley | G06F 3/1454 345/2.1 |
| 2004/0174774 A1* | 9/2004 | Tasaka et al. | 368/84 |
| 2005/0007297 A1* | 1/2005 | Bhogal | G09G 5/14 345/1.1 |
| 2005/0116943 A1 | 6/2005 | Wohrle et al. | |
| 2005/0197113 A1 | 9/2005 | Lin et al. | |
| 2006/0083194 A1 | 4/2006 | Dhrimaj et al. | |

OTHER PUBLICATIONS

U.S. Office Action dated May 3, 2007 in U.S. Appl. No. 11/090,154.
U.S. Office Action dated Sep. 27, 2007 in U.S. Appl. No. 11/090,154.
U.S. Office Action dated Nov. 16, 2007 in U.S. Appl. No. 11/090,154.
U.S. Office Action dated Jun. 13, 2008 in U.S. Appl. No. 11/090,154.
U.S. Office Action dated Mar. 5, 2009 in U.S. Appl. No. 11/090,154.
U.S. Office Action dated Aug. 19, 2009 in U.S. Appl. No. 11/090,154.
U.S. Office Action dated Feb. 19, 2010 in U.S. Appl. No. 11/090,154.
U.S. Office Action dated Jul. 7, 2010 in U.S. Appl. No. 11/090,154.
U.S. Notice of Allowance dated Aug. 17, 2011 in U.S. Appl. No. 11/090,154.
U.S. Office Action dated Mar. 27, 2012 in U.S. Appl. No. 13/297,179.
U.S. Notice of Allowance dated Sep. 13, 2012 in U.S. Appl. No. 13/297,179.
U.S. Office Action dated Apr. 24, 2013 in U.S. Appl. No. 13/690,734.
U.S. Notice of Allowance dated Jul. 31, 2013 in U.S. Appl. No. 13/690,734.
U.S. Notice of Allowance dated Nov. 20, 2013 in U.S. Appl. No. 13/690,734.
U.S. Notice of Allowance dated Feb. 28, 2014 in U.S. Appl. No. 13/690,734.

* cited by examiner

SYSTEM, METHOD AND APPARATUS FOR WIRELESS COMMUNICATION BETWEEN A WIRELESS MOBILE TELECOMMUNICATIONS DEVICE AND A REMOTE WIRELESS DISPLAY

CROSS-REFERENCE TO RELATED APPLICATIONS

This application is a continuation of U.S. patent application Ser. No. 13/690,734, filed Nov. 30, 2012, now U.S. Pat. No. 8,781,535 issued Jul. 15,2014; which is a continuation of U.S. patent application Ser. No. 13/297,179, filed Nov. 15, 2011, now U.S. Pat. No. 8,532,645 issued Sep. 10, 2013, which is a continuation of U.S. patent application Ser. No. 11/090,154, filed Mar. 28, 2005, now U.S. Pat. No. 8,081, 964 issued Dec. 20, 2011; wherein the contents of each are incorporated by reference herein in their entireties into this disclosure.

BACKGROUND OF THE INVENTION

Field of the Invention

The present invention relates to the field of wireless mobile telecommunications devices such as a wireless mobile telephone, personal digital assistant (PDA), or pager, with an operable remote display.

Description of the Related Art

Wireless mobile telecommunications devices ("mobile devices") have been and are being developed with hands-free and remote operation features. These mobile devices operate on a wireless network, such as a cellular network, to provide voice, data, information, and media services. However, some mobile devices may be bulky or require user response or operation at an inconvenient time.

Several current computer devices allow a user to be away from a device, but still receive remote wireless outputs and provide wireless remote inputs, including visually displayed output information and touch pad inputs from a visual display/control screen.

One such apparatus is a "Windows Powered Smart Display." This apparatus is a remote computer that includes a touch-screen monitor that displays the information that is displayed on a user's Windows XP-enabled personal computer (PC). The apparatus processes control and data inputs and communicates with the PC via an 802.11 wireless protocol. Using this protocol, the device displays the PC's monitor. Because the apparatus is a touch screen device, the user may navigate the web and the PC's hard drive and software using a stylus. The display also has the capability to be used as an on-screen keyboard and may be equipped with handwriting recognition for inputs. The device is portable to the range of the 802.11 wireless protocol. However, such a device is relatively large and includes its own processor that functions only with windows-operable PCs.

A wireless communications protocol that is increasing in use and popularity is called Bluetooth. This protocol functionally removes the wires for communications between a wide range of electronic devices such as PCs, printers, wireless network devices, and computer systems for automotive vehicles. The protocol was designed to be used with any electronic device equipped with a Bluetooth transceiver to enable data transmission with another device also equipped with a Bluetooth transceiver. As the technology has developed, several different protocols are in use. This protocol is advantageous for short-range communications and data transmissions between the different "Bluetooth-enabled" devices. Bluetooth transmissions allow communication between a wide variety of data types using a number of protocols.

Automakers are beginning to employ electronic control and display systems in their automotive vehicles. Some vehicles are being equipped with touch-screen panels that provide driver controls and directional functions. Some manufacturers are incorporating Bluetooth technology and phone capabilities into these displays. The driver is thus able to program his or her "phone book" and other information into the vehicle's computer. When the driver selects a desired entry from the display, the vehicle computer selects the correct telephone number from the data base and sends a command that connects to the Bluetooth enabled device, usually a telephone, through the Bluetooth protocol, and the telephone dials the entry without the driver's manual attention. Such systems are also usually linked by Bluetooth to the vehicle's audio system and to a microphone so that the driver may carry on a conversation without physically holding the telephone.

These short-range wireless communication protocols may include infrared communications, although infrared is not preferred because it is limited to line of sight communications. These communications protocols also may include 802.11 and other 802 protocols, although such protocols may require more processing capacity than is desirable for small mobile wireless devices and removable displays and may not be sufficiently limited in range to avoid interference with other small mobile wireless devices and removable displays.

SUMMARY OF THE INVENTION

In accordance with one important aspect of the invention, a system and method are provided which use short range wireless communication protocols to transmit visual display screen control information between a wireless mobile device and a remote display. Such a short range wireless protocol allows transmissions of visual display control signals between the mobile wireless device and the remote display. In one embodiment, the remote display is mechanically carried in the wireless mobile device and is removable to enable the user to detach the remote display device for use at remote locations. In other embodiments, the remote display is incorporated in other devices, or is mounted in various remote locations and/or upon various items such as watch or wrist bands, belts and other articles of apparel. Such placement allows a user to manage the mobile wireless device without having to be in close proximity to the device and to conveniently view information while engaged in other activities.

In another embodiment, the remote or removable display includes controls to operate the features of the mobile wireless device. In the embodiment, an interface translates the signals from the controls into signals appropriate for transmission by a transceiver. The transceiver will pair with a corresponding transceiver located within the mobile wireless device so as to provide for sending of signals between the transceivers.

In accordance with another aspect of the invention, there is provided a mobile wireless communication system, comprising:

a wireless communication device including a short-range signal transmitter configured to transmit visual display control signals; and a remote display device including a display screen, a receiver for receiving said visual display control signals from said short-range signal transmitter and for producing a related output, and a graphic driver in communication with said receiver for receiving said related output from said receiver, for converting said related output into operating signals for said display screen, and for communicating said operating signals to said display screen to produce a visual display based on said visual display control signals transmitted by said short range transmitter.

Preferably, transmission of the visual display control signals between the wireless communication device and the remote display device is accomplished via a short range wireless communication protocol.

Advantageously, the short range wireless protocol used for the communication is Bluetooth or an 802.XX protocol.

According to a further aspect of the invention, there is provided a mobile wireless communication system, comprising:

a wireless communication device, including a housing and a short-range transmitter configured to transmit visual display signals; and a removable display device removably mounted in said housing, said removable display device including a display screen, a receiver for receiving visual display signals from said short-range transmitter and for producing a related output, and a graphic driver in communication with said receiver for receiving and converting said related output from said receiver to operating signals for said remote display device and communicating said operating signals to said display screen to produce a visual display.

Preferably, the transmission of visual display control signals between the wireless communication device and the removable display device is accomplished by a short range wireless communication protocol.

Advantageously, the mobile wireless device housing mechanically engages a physical aspect of the removable display device to hold it firmly within the housing.

Preferably, transmission of visual display control signals between the mobile wireless device and the removable display device occurs while the removable device is mechanically engaged within the mobile wireless device housing and the mobile wireless device includes an induction coil battery charger to charge the battery of the removable display device so that the removable display device can be sealed and weather tight.

In accordance with another aspect of the invention, there is provided a mobile communication system, comprising:

a wireless communication device including a first display screen for displaying information thereon and a short-range transmitter configured to transmit visual display control signals; and a remote display device including a second display screen and a receiver for receiving said visual display control signals from said short-range transmitter and for producing a related output, and a graphic driver in communication with said receiver for receiving said related output from said receiver, for converting said related output into operating signals for said display screen, and for communicating said operating signals to said display screen to produce a visual display that emulates at least a portion of said information displayed on said first display screen.

Preferably, the first display screen is fixed within the mobile wireless device housing and the remote display receives visual display control signals to emulate at least a portion of the information displayed on the first display screen.

In accordance with another aspect of the invention, there is provided a mobile wireless communication system, comprising:

a wireless communication device, including a housing and a short-range transmitter configured to transmit visual display signals; and a removable display device removably mounted in said housing, said removable display device including a display screen, a receiver for receiving said visual display control signals from said short-range transmitter and for producing a related output, and a graphic driver in communication with said receiver for receiving said related output from said receiver, for converting said related output into operating signals for said display screen, and for communicating said operating signals to said display screen, said display screen displaying information thereon based on said operating signals when said device is mounted in said housing, and displaying, based on said operating signals, at least part of said information when said display device is removed from said housing.

In accordance with another aspect of the invention, there is provided a mobile wireless communication system, comprising:

a wireless communication device, including a first display screen and a first short-range signal transceiver configured to transmit visual display control signals and receive operational control signals related to the operation of said wireless communication device; and a remote display device, including a second display screen, an input device for generating said operational control signals, a second short range transceiver for receiving said visual display control signals from said first short-range signal transceiver and producing a related output and for transmitting said operational control signals to said first short-range signal transceiver, and a graphic driver in communication with said second transceiver for receiving and converting said visual display control signals from said first transceiver to operating signals for said second display screen and for communicating said operating signals to said second display screen to produce a display, and an input/output interface in communication with said input device, with said second display screen, and with said second transceiver in order to receive said operational control signals from said input device and communicate said operational control signals to said second transceiver to be transmitted to said first transceiver for remote operation of said wireless device.

Preferably, the input device is incorporated into the remote display device as a stylus- or touch-operated display screen, a touchpad, or hot buttons.

Preferably, the input/output interface within the remote display device is substantially similar to the one located within the mobile wireless device connected to the transceiver within the remote display device.

In an important implementation of the invention, the first and second transceivers pair to transmit and receive signals between them.

In accordance with another aspect of the invention, there is provided a mobile wireless communication system, comprising:

a wireless communication device, including a housing and a first short-range signal transceiver configured to transmit visual display control signals and receive operational control signals related to the operation of said wireless communication device; and a removable display device removably mounted in said housing, said removable display device including a display screen, an input device for generating said operational control signals, a second short range transceiver for receiving visual display control signals from said first short-range signal transceiver and for producing a related output and for transmitting said operational control to said first short-range signal transceiver, and a graphic driver in communication with said second transceiver for receiving and converting said visual display control signals from said first transceiver to operating signals for said display screen and for communicating said operating signals to said display screen to produce a display, and an input/output interface in communication with said input device, with said display screen, and with said second transceiver in order to receive said operational control signals from said input device and communicate said operational control signals to said second transceiver.

These and other features and advantages of the present invention will be set forth herein, or will be apparent from, the detailed description of the preferred embodiments which follow.

BRIEF DESCRIPTION OF THE DRAWINGS

Preferred and alternative embodiments are described below with reference to the attached figures wherein like reference numerals indicate similar or identical features or functions, and wherein.

DETAILED DESCRIPTION OF THE INVENTION

The present invention relates to the field of wireless mobile telecommunications and wireless devices that may operate with a removable display or a remote display. Data communication between the wireless device and removable or remote display could be accomplished by a number of short-range wireless communication protocols. It will be clear to one reasonably skilled in the art that the following descriptions are exemplary embodiments and not the exclusive embodiments of the invention.

Figure 1:
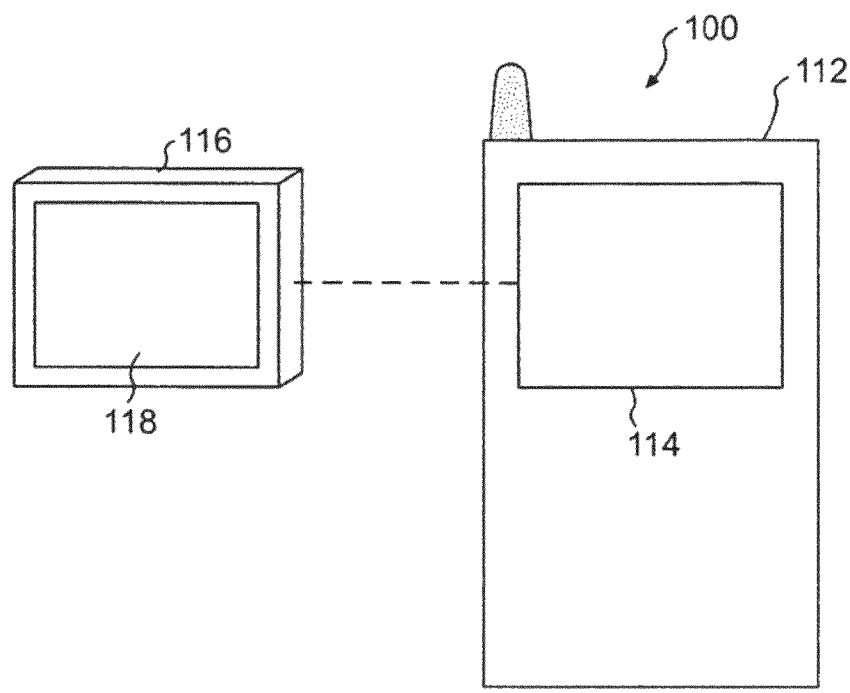
FIG. 1 is a perspective view of a preferred embodiment of a wireless mobile device with a removable display made in accordance with the present invention.

Referring first to FIG. 1, in one exemplary embodiment, the wireless device is a mobile wireless device 100. As shown, the mobile wireless device 100 is designed with a housing 112 defining a receptacle 114 for receiving the removable display device 116, which commonly and generally comprises a liquid crystal display (LCD) screen 118. The removable display device 116 may be held in place in the receptacle 114 by conventional fastening systems, including for example, clips, fasteners, latch mechanisms, adhesive fasteners, Velcro, and other fastening systems now known to those skilled in the art and to be developed in the future. The removable display device 116 will show the same information and graphics that a display permanently attached and connected to the mobile wireless device 100 would show. The removable display device 116 will receive the display information from the main mobile wireless device 100 continuously and in real time and will display this information whether the removable display device 116 is mounted in the mobile wireless device 100 or separated from the mobile wireless device 100, as long as the removable display device 116 is within range of the short-range display transmitter of the mobile wireless device 100.

Figure 2:
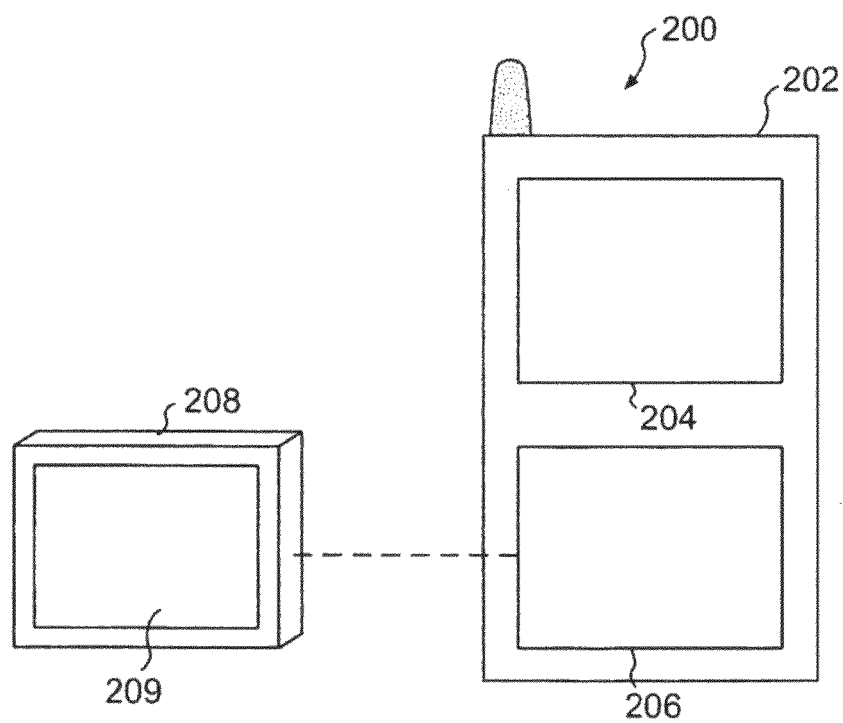
FIG. 2 is a perspective view of a preferred embodiment of a wireless mobile device with both a permanent display and a removable display made in accordance with the present invention.

Referring to FIG. 2, an exemplary embodiment includes a mobile wireless device 200. The mobile wireless device 200 includes a housing 202, also referred to herein as a wireless device housing, with a permanently mounted display 204. In addition to the permanent display 204, the housing 202 includes a receptacle 206 designed to receive a removable display 208, also referred to herein as a removable display device, removably mounted in the same manner described above for the embodiment shown in FIG. 1. The removable display 208 communicates with the mobile wireless device 200 in the same manner and also includes an LCD display screen 209, also referred to herein as an LCD display and a display screen, as described above relating to FIG. 1.

Figure 3:
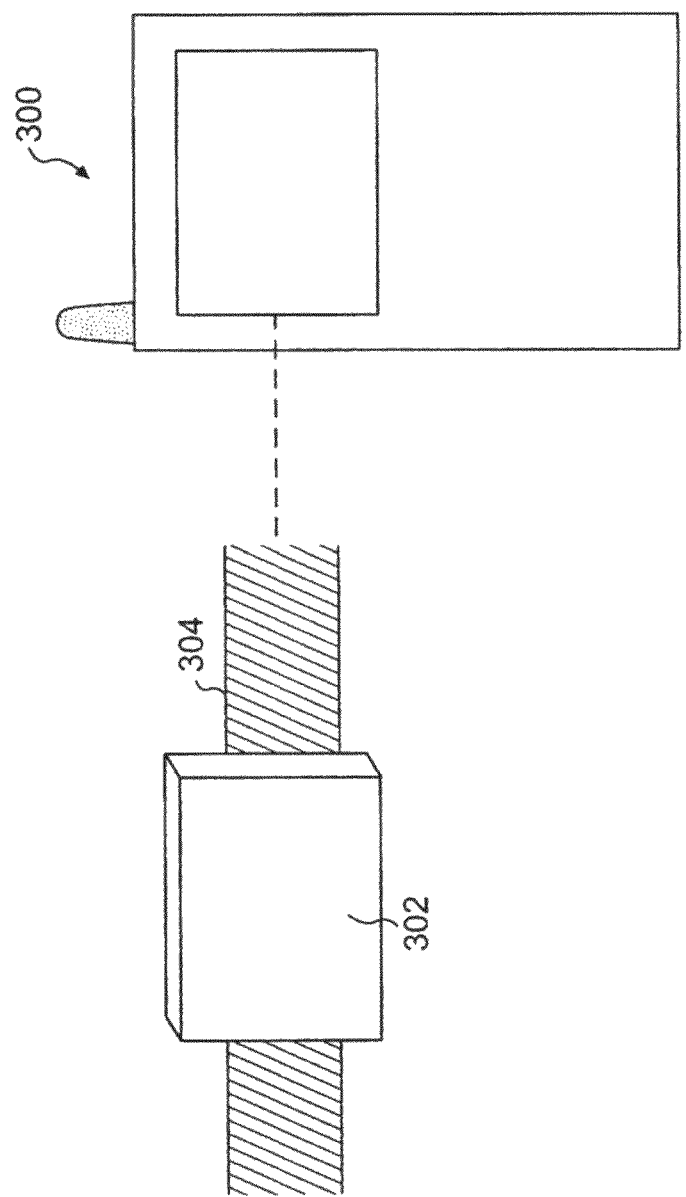
FIG. 3 is a perspective view of a preferred embodiment of a wireless mobile device with a removable display that may also attach to a band or strap, such as a watch, belt, or armband.

Referring to FIG. 3, another exemplary embodiment includes a mobile wireless device 300 with a removable display 302 substantially similar to that in FIGS. 1 and 2. However, the removable display 302 may be attached to and carried by a band or strap 304 that may be a part of a belt, watch, armband, bag, jewelry, or other article of clothing. The removable display 302 may also include a mounting feature to engage a receiving feature in order to mount the device on a fixed surface.

Figure 4:
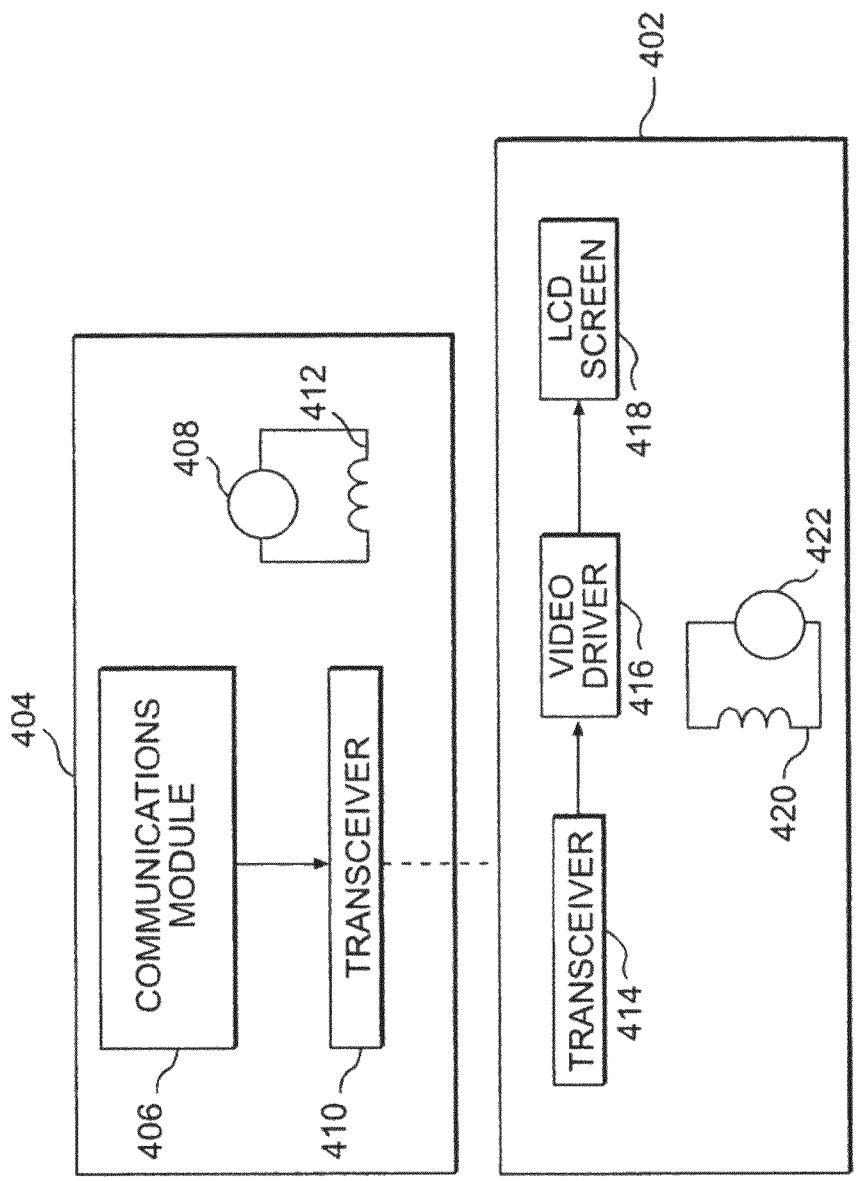
FIG. 4 is a schematic block diagram of one preferred embodiment of the primary functional components of a wireless device with a removable remote display device made in accordance with the present invention.

Referring now to FIG. 4, a simple schematic of the exemplary embodiments is shown in which the removable display device 402 is physically separated and remote from the components necessary for the mobile wireless device functionality, which are located in the receiving housing 404. The receiving housing 404, also referred to herein as the mobile wireless device housing, includes a communications module 406 for communicating with and processing data from a wireless telecommunications network, a power source 408, and a wireless transceiver 410, also referred to herein as a transceiver, a first transceiver, and a short-range transceiver, for communication with the removable display device 402. The receiving housing 404 may also include an inductive coil 412 electrically connected to the power source 408 that may charge a power source 422 in the removable display device 402. Of course, various enclosures or housings specific to a certain mobile wireless device could be employed without departing from the spirit and scope of the present invention. Regardless of the selected enclosure, a wireless transceiver 410 for communicating via a short-range wireless communication protocol is connected to the communications module 406. This wireless transceiver 410 receives a serial data string from the communications module 406. The received data string is then communicated to a video driver 416 associated with the removable display device 402.

Referring still to FIG. 4, a second transceiver 414, also communicating via a short-range wireless communication protocol and also referred to herein as a second short-range transceiver and a transceiver, is configured to receive the serial data string from the first transceiver 410 located within the mobile wireless device housing 404. The second transceiver 414 is operably and electronically connected to a video driver 416. The second transceiver 414 communicates the serial data string to the video driver 416. The video driver 416 then processes the serial data strings to provide operating signals for the LCD screen 418 and communicates those operating signals to the LCD screen 418 of the removable display device 402 as long as the first short-range transceiver 410 and second short-range transceiver 414 are within operating range. As a result, the removable display device 402 is continually updated and displays and emulates the wireless device screen. In this regard, it is thus also contemplated that the removable display device 402 includes a power source 422 for powering the components of the removable display device 402. Said power source 422 may be a replaceable battery or may be charged by an inductive coil 420 located within the removable display device 402 that electrically interacts with an inductive coil 412 in the mobile wireless device housing 404, when the removable display device 402 is mounted in the mobile wireless device housing 404.

Figure 5A:
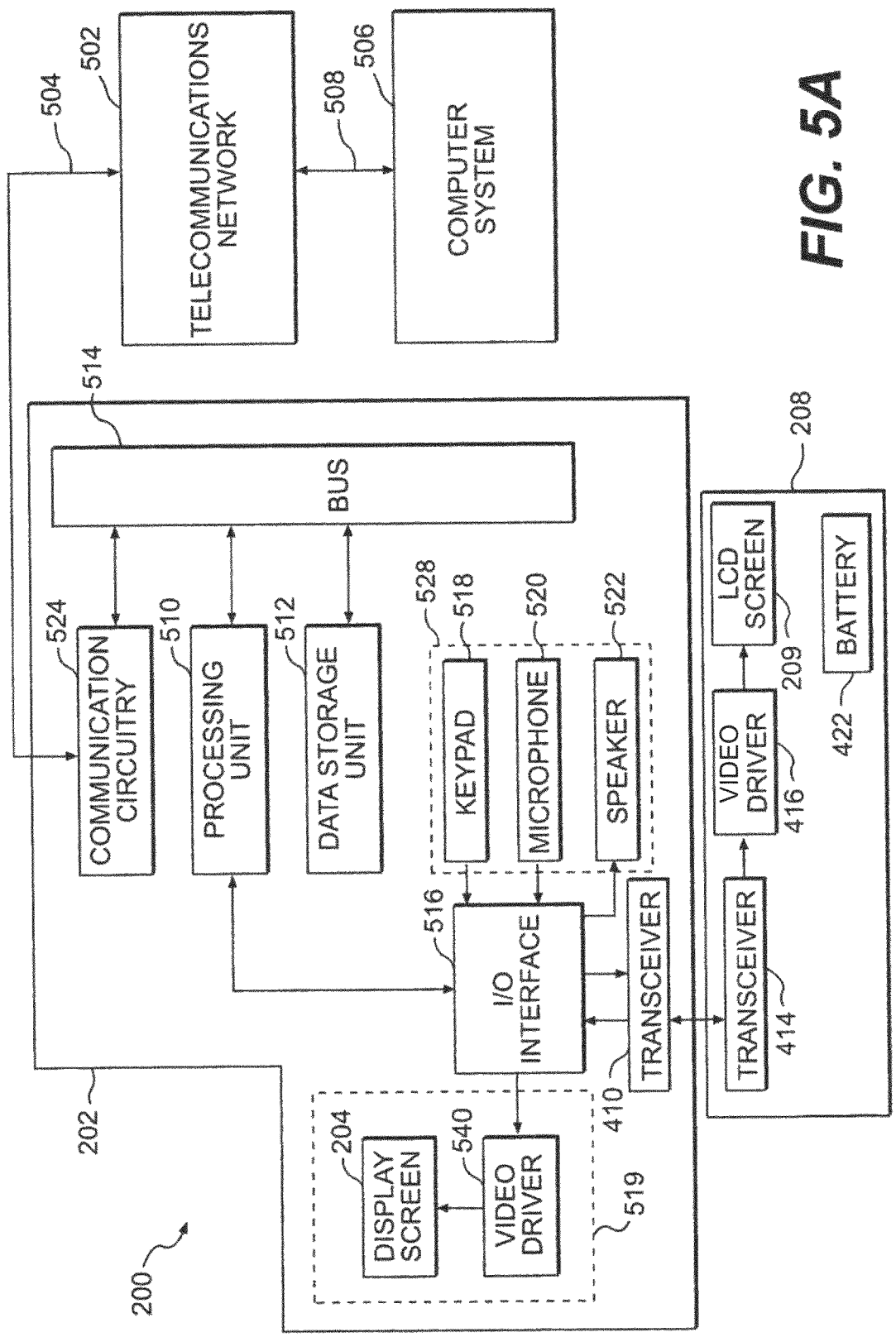
FIG. 5A is a schematic block diagram of one preferred embodiment of the primary functional components of a mobile wireless device with a remote display made in accordance with the present invention.

Referring to FIG. 5A, a more detailed schematic of the exemplary embodiments described above in FIGS. 1 through 4 is shown. FIG. 5 shows the primary functional components of the apparatus of a mobile wireless device 200. As shown in FIG. 2, the exemplary embodiment is a mobile wireless device 200 that may communicate voice or data to a wireless telecommunications network 502, such as any cellular wireless network currently known or to be developed, using a long range bidirectional communications link 504. The wireless telecommunications network 502 may also be linked to a computer system 506 via another bi-directional communication link 508. The computer system 506 may be one or more computer servers interacting with the telecommunications network 502, including, but not limited to, a voicemail server, messaging server, or billing system.

Still referring to FIG. 5A, the mobile wireless device 200 includes a processing unit 510 that is coupled via a bi-directional communications link to the other components of the wireless mobile device 200 via a bus 514. The mobile wireless device 200 also includes a data storage unit 512, which may be any type of memory, including, but not limited to RAM, EPROM, or EEPROM memory. The processing unit 510 and the data storage unit 512 communicate via the bus 514. Alternatively, the processing unit 510 and the data storage unit 512 may be included on the same microprocessor.

Continuing to refer to FIG. 5A, the mobile wireless device 200 further includes an I/O interface 516, which may reside on the same microprocessor as the processing unit 510 or stand alone as a separate unit electrically connected to the processing unit 510. The I/O interface 516 connects the processing unit 510 to a user interface 528. For a mobile telephone, the user interface 528 generally comprises a keypad input 518, a microphone input 520, a speaker output 522, and a video driver/display combination 519 (as will be described below). The I/O interface 516 may include an analog-to-digital converter for converting an analog microphone signal to a digital signal for use by the processing unit 510. The I/O interface 516 may also include a digital-to-analog converter to convert digital information from the processing unit 510 to the speaker 522, such as voice data.

In the exemplary embodiment of FIG. 5A, the I/O Interface 516 may also be electrically and physically connected to a video driver 540 located within the housing 202 of the mobile wireless device 200 as shown in FIG. 2. The video driver 540 is in communication with the display screen 204 and is capable of processing the output from the I/O interface 516 to provide operating signals to the display screen 204 to cause the display screen 204 to display either color or monochrome images.

Still referring to FIG. 5A, the processing unit 510 is capable of transmitting and receiving digital signals that are to be communicated outside the mobile wireless device 200 via the communication circuitry 524. In a cellular telephone, the communication circuitry 524 is capable of transmitting and receiving wireless signals through airwaves to the telecommunications network 502 via the bi-directional communication link 504.

The apparatus in this exemplary embodiment shown in FIG. 5A for enabling communication between the housing of the mobile wireless device 200 and the removable display device 208 also includes a transceiver 410 connected to the I/O interface 516. The transceiver 410 is capable of receiving a serial data string that is to be communicated via a short-range wireless communication protocol, such as Bluetooth wireless communication protocol, to a video driver 416 associated with the removable display device 208. A corresponding transceiver 414 capable of communicating with transceiver 410 via the Bluetooth wireless communication protocol is connected, physically and electrically, to a video driver 416 within the removable display device 208, and thus, the second transceiver 414 is capable of receiving the serial data string from the first transceiver 410 and communicating that serial data string to provide operating signals to the video driver 416. The video driver 416 is in communication with the LCD screen 209 and is capable of processing the serial data string to provide operating signals to the LCD screen 209 on the removable display device 208 to cause the LCD screen 209 to display either color or monochrome images.

It is also contemplated that the removable display device 208 also will include a power source 422, such as a replaceable or rechargeable battery 422. The battery 422 may be capable of being recharged through an inductive coil 420 (as shown in FIG. 4) so as not to penetrate or compromise the display screen 209 for powering the components of the removable display device 208. As such, the removable display device 208 may be weather-tight and all communication between the removable display device 208 and mobile wireless device 200, even if docked in the mobile wireless device 200, is accomplished through a short-range wireless communications protocol.

Figure 5B:
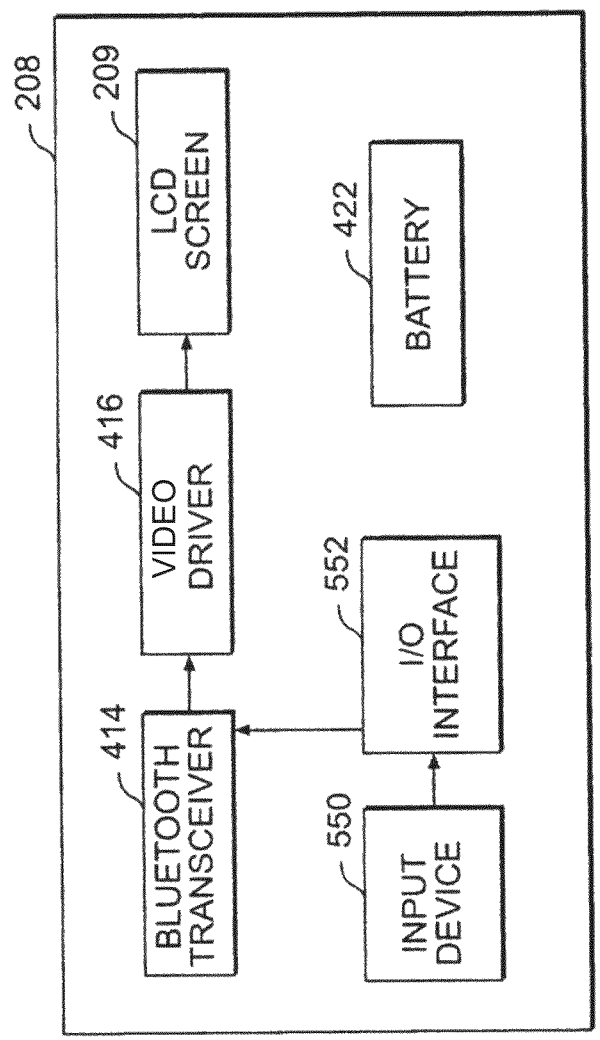
FIG. 5B is a schematic block diagram of one preferred embodiment of the primary functional components of the removable display device made in accordance with the present invention.

FIG. 5B is a detailed schematic incorporating the wireless device 200 from FIG. 5A. As demonstrated, however, FIG. 5B presents an alternate embodiment of the removable display device 208. In addition to the embodiment in FIG.

5A, the removable display device 208 has an input device 550 that may consist of controls, such as hot buttons, a keypad, a variable function touchpad or a pressure-sensitive touch display screen to operate functions of the wireless device 200. This input device 550 will be electrically and logically connected to an I/O Interface 552, which translates the inputs into control signals. The I/O Interface 552 is electrically and logically connected to the transceiver 414, which transmits a serial data string to another transceiver 410 located within the wireless device housing 202, as shown in FIG. 5A.

Figure 6:
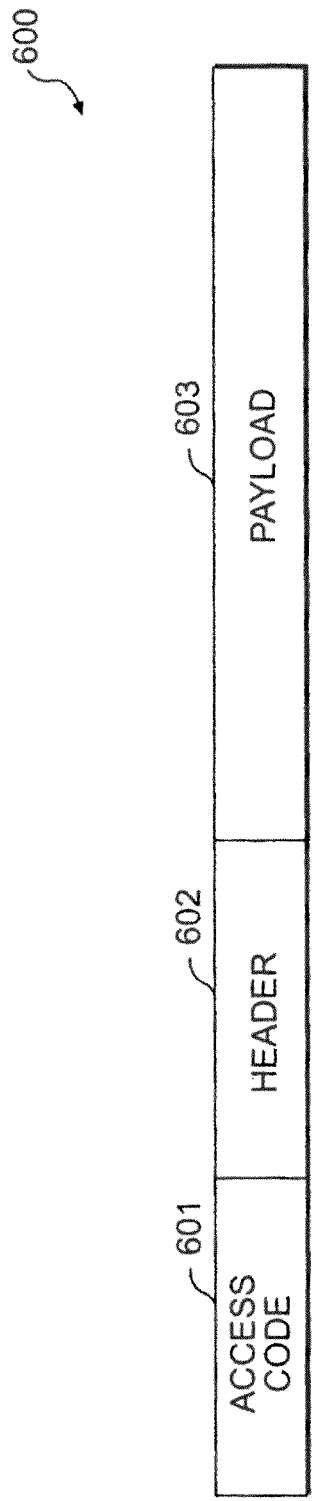
FIG. 6 is a diagram illustrating a typical Bluetooth protocol packet used in accordance with one preferred embodiment of the present invention.

Referring now to FIG. 6, in an exemplary embodiment the wireless communication between the device and the display will be accomplished using a standard packet format, such as that provided in Bluetooth protocol v. 1.2. (Bluetooth is a trademark of the Bluetooth Special Interest Group of Overland Park, Kans.) Data is transmitted between two Bluetooth transceivers by placing the information into packets 600 as defined by the specific protocol. Each packet is divided into several segments of information necessary to transmit the data. The first information segment in the packet is the Access Code 601. The Access Code 601 will contain synchronization information for "pairing" the two transceivers. Its length in bits will vary depending on the type of information to be sent in the packet, such as whether it is a page to the receiving device or sending actual data. The Header section 602 may contain addressing and source information for the sending and receiving transceivers, the type of data being delivered in the packet, data ordering information, and an error check.

Still referring to FIG. 6, the final packet section is the Payload section 603 containing the actual data to be transmitted. In the preferred embodiment, the information transmitted will be the data necessary for the video driver 416 to project the necessary graphic representations on the removable display device 208. The Payload section 603 also contains an error check, information regarding the length of the data, and flow control information.

Figure 7:
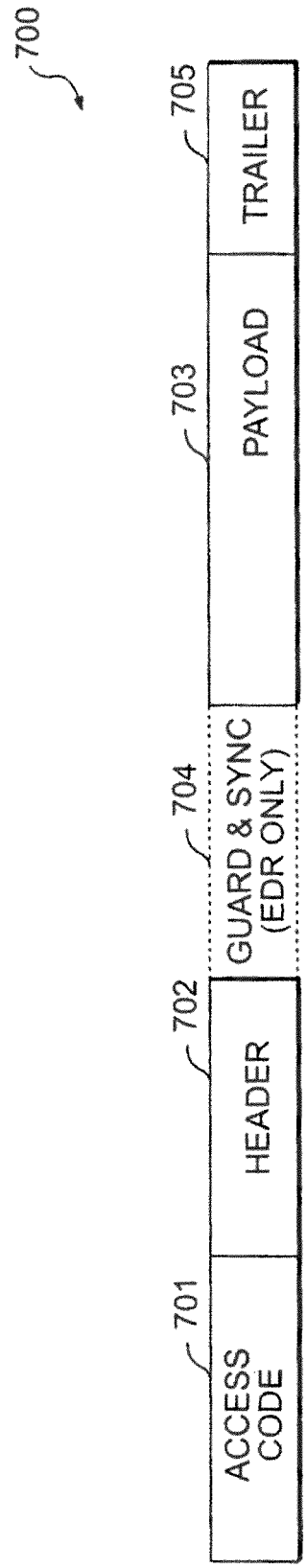
FIG. 7 is a diagram illustrating a more advanced version of a Bluetooth protocol packet that includes Enhanced Data Rate technology used in accordance with another preferred embodiment of the present invention.

Referring now to FIG. 7, a more recent version of the Bluetooth communication protocol [v.2.o+EDR] may be used. This more recent version contains an additional element in the transmitted packet as illustrated by 700. As illustrated by 701, 702, and 703, the Access Code, Header, and Payload are substantially the same as those described and illustrated by 601, 602, and 603, respectively, above. However, a more recent Bluetooth protocol incorporates an Enhanced Data Rate (EDR) capability. As illustrated by 704, the EDR protocol includes a new packet section that contains timing and synchronization information. As illustrated by 705, the packet also contains a trailer that includes modulation information. The EDR protocol may be used to specify the type of data being transferred and allow the receiver to demodulate the message per type of data.

Figure 8:
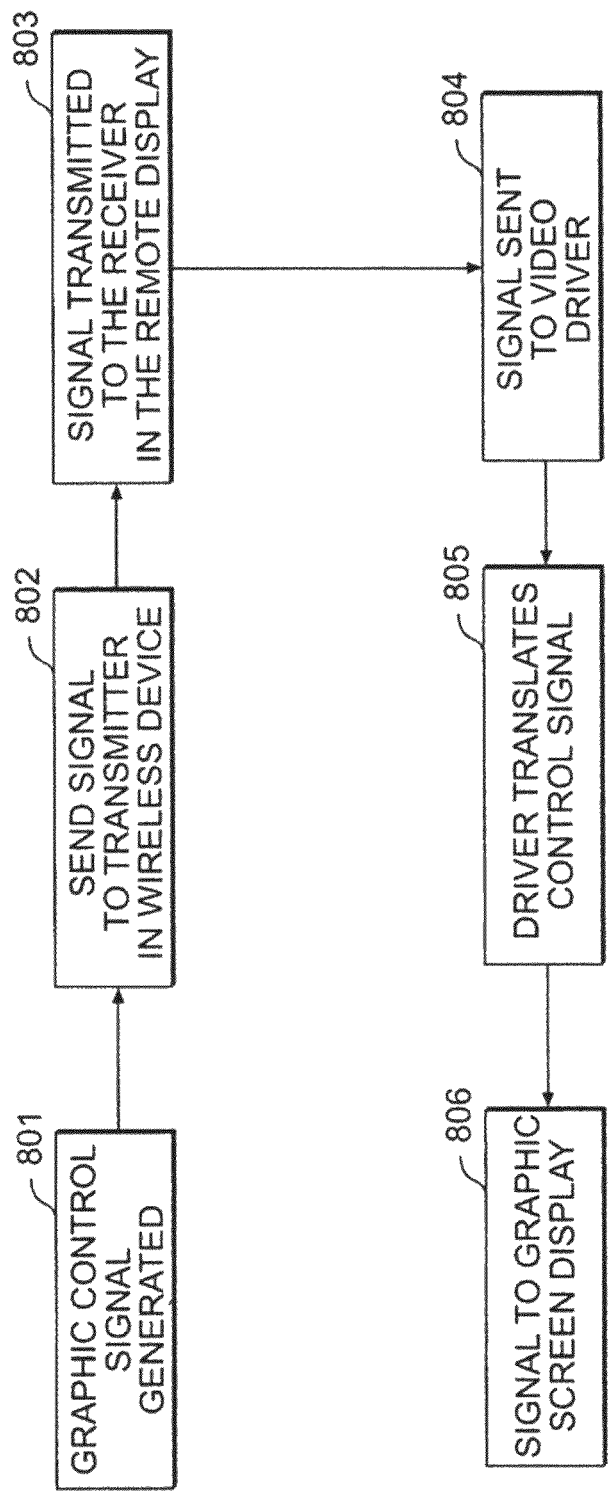
FIG. 8 is a flow chart illustrating one preferred embodiment of a method for communicating display inputs and outputs between a mobile wireless telecommunications device and a remote display made in accordance with the present invention.

Referring now to FIG. 8, shown is a flow chart of the method of a preferred embodiment of the invention. As indicated by start block 801, a mobile wireless device first generates a signal that controls what is displayed on the graphic screen. The next step as indicated by box 802 is to send the signal to a transmitter in the mobile wireless device. The next step as indicated by box 803 is that the signal is transmitted wirelessly using a short-range wireless data transmission protocol to a receiver in the remote display. Once received by the remote display device, the next step as indicated by box 804 is that the signal is sent from the receiver to the graphic or video driver within the remote display device. Then, as indicated by box 805, a video or graphic driver translates the control signal into the necessary operating signals to project the required image on the screen. As indicated by box 806, the operating signals are then communicated to the screen. Each of these control signals is sent 806 to the screen display to cause individual LEDs to light and project an image on the screen.

It will be obvious to those skilled in the art that further modifications may be made to the embodiments described herein without departing from the spirit and scope of the present invention. Further, it will be obvious that the preferred embodiments include multiple wireless device types that may operate with a wireless network and accommodate voice, data, and multimedia, or any combination thereof.

What is claimed is:

1. A watch comprising:
a band; and
a remote display device comprising
a processor, and
a memory storing instructions that, when executed by the processor, cause the processor to perform operations comprising:
wirelessly receiving, from a transceiver of a mobile telecommunications device, a visual display control signal generated by the mobile telecommunications device, wherein the visual display control signal controls information being displayed on a permanent display of the mobile telecommunications device, and wherein the mobile telecommunications device comprises a housing within which the permanent display and the transceiver are located, and
producing, using the visual display control signal from the mobile telecommunications device, an output for display by the remote display device, the output comprising a portion of the information being displayed on the permanent display of the mobile telecommunications device.

2. The watch of claim 1, wherein the remote display device further comprises a battery.

3. The watch of claim 2, wherein the remote display device further comprises an inductive coil, and wherein the battery of the remote display device is charged by the inductive coil of the remote display device when the inductive coil of the remote display device interacts with an inductive coil of the mobile telecommunications device while the remote display device is physically coupled to the mobile telecommunications device.

4. The watch of claim 1, wherein the remote display device further comprises an LCD display for displaying the output.

5. The watch of claim 4, wherein the operations further comprise converting the visual display control signal into an operating signal for the LCD display.

6. The watch of claim 1, wherein the remote display device further comprises an impenetrable and weather-tight housing.

7. The watch of claim 1, wherein the remote display device further comprises at least one of a Bluetooth transceiver or an 802.xx transceiver.

8. The watch of claim 1, wherein the remote display device further comprises an input device for receiving an input to operate a function of the mobile telecommunications device.

9. A non-transitory computer-readable medium storing instructions that, when executed by a processor of a remote display device of a watch, cause the processor to perform operations comprising:

wirelessly receiving, from a transceiver of a mobile telecommunications device, a visual display control signal generated by the mobile telecommunications device, wherein the visual display control signal controls information being displayed on a permanent display of the mobile telecommunications device, and wherein the mobile telecommunications device comprises a housing within which the permanent display and the transceiver are located; and producing, using the visual display control signal from the mobile telecommunications device, an output for display by the remote display device, the output comprising a portion of the information being displayed on the permanent display of the mobile telecommunications device.

10. The non-transitory computer-readable medium of claim 9, wherein the remote display device comprises a battery.

11. The non-transitory computer-readable medium of claim 10, wherein the remote display device further comprises an inductive coil, and wherein the battery of the remote display device is charged by the inductive coil of the remote display device when the inductive coil of the remote display device interacts with an inductive coil of the mobile telecommunications device while the remote display device is physically coupled to the mobile telecommunications device.

12. The non-transitory computer-readable medium of claim 9, wherein the operations further comprise displaying, via an LCD display of the remote display device, the output.

13. The non-transitory computer-readable medium of claim 12, wherein the operations further comprise converting the visual display control signal into an operating signal for the LCD display.

14. The non-transitory computer-readable medium of claim 9, wherein the operations further comprise supplying the visual display control signal to a graphics driver within the remote display device.

15. The non-transitory computer-readable medium of claim 9, wherein the remote display device further comprises an impenetrable and weather-tight housing.

16. The non-transitory computer-readable medium of claim 9, wherein the remote display device further comprises at least one of a Bluetooth transceiver or an 802.xx transceiver.

17. A method comprising:
wirelessly receiving, at a remote display device of a watch, from a transceiver of a mobile telecommunications device, a visual display control signal generated by the mobile telecommunications device, wherein the visual display control signal controls information being displayed on a permanent display of the mobile telecommunications device, and wherein the mobile telecommunications device comprises a housing within which the permanent display and the transceiver are located; and producing, by the remote display device of the watch, using the visual display control signal from the mobile telecommunications device, an output for display by the remote display device, the output comprising a portion of the information being displayed on the permanent display of the mobile telecommunications device.

18. The method of claim 17, further comprising displaying, via an LCD display of the remote display device, the output.

19. The method of claim 18, further comprising converting, by the remote display device, the visual display control signal into an operating signal for the LCD display.

20. The method of claim 17, wherein the remote display device comprises a battery and an inductive coil, and wherein the battery of the remote display device is charged by the inductive coil of the remote display device when the inductive coil of the remote display device interacts with an inductive coil of the mobile telecommunications device while the remote display device is physically coupled to the mobile telecommunications device.

* * * * *